(12) United States Patent
Giannetti

(10) Patent No.: US 10,725,867 B2
(45) Date of Patent: Jul. 28, 2020

(54) TRACKING MICROSERVICES USING A STATE MACHINE AND GENERATING DIGITAL DISPLAY OF ROLLBACK PATHS

(71) Applicant: Cisco Technology, Inc., San Jose, CA (US)

(72) Inventor: Fabio Giannetti, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/927,649

(22) Filed: Mar. 21, 2018

(65) Prior Publication Data

US 2019/0294504 A1    Sep. 26, 2019

(51) Int. Cl.
*G06F 11/00* (2006.01)
*G06F 11/14* (2006.01)
*G06F 3/0482* (2013.01)
*G06F 9/451* (2018.01)

(52) U.S. Cl.
CPC ........ *G06F 11/1441* (2013.01); *G06F 3/0482* (2013.01); *G06F 9/451* (2018.02); *G06F 11/1464* (2013.01); *G06F 11/1469* (2013.01); *G06F 2201/82* (2013.01)

(58) Field of Classification Search
CPC .......................... G06F 11/1464; G06F 11/1469
See application file for complete search history.

(56) References Cited

U.S. PATENT DOCUMENTS

| | | | |
|---|---|---|---|
| 2005/0192979 A1* | 9/2005 | Keller | ........................ G06F 8/61 |
| 2006/0294507 A1* | 12/2006 | Buskens | ............... G06F 9/5066 |
| | | | 717/133 |
| 2009/0172470 A1* | 7/2009 | Bobak | ................. G06F 11/1482 |
| | | | 714/16 |
| 2014/0304545 A1* | 10/2014 | Chen | .................... G06F 11/1438 |
| | | | 714/4.3 |

* cited by examiner

*Primary Examiner* — Charles Ehne
(74) *Attorney, Agent, or Firm* — Merchant & Gould P.C.

(57) ABSTRACT

Techniques for tracking microservices and facilitating rollbacks in response to exceptions are described herein. In an embodiment, a server computer system receives, from one or more sets of microservices program instructions, digital data identifying a plurality of tasks and a sequence of the tasks, the digital data specifying a particular computational workflow for execution by a computer. During execution of the workflow by the server computer system, the system identifies a particular failure in a first task of the plurality of tasks. The system causes displaying on a client computing device, a graphical user interface comprising a plurality of nodes, the nodes corresponding to the tasks. Within the graphical user interface, the system further causes displaying, with a particular node of the plurality of nodes corresponding to the first task, a graphical indication that the first task failed. Within the graphical user interface, the system further causes displaying, with the plurality of nodes, a first rollback path comprising nodes and edges, the first rollback path comprising one or more graphical edges that graphically bypass each task of the workflow that would not be executed if a rollback is executed by the computer according to the first rollback path.

20 Claims, 9 Drawing Sheets

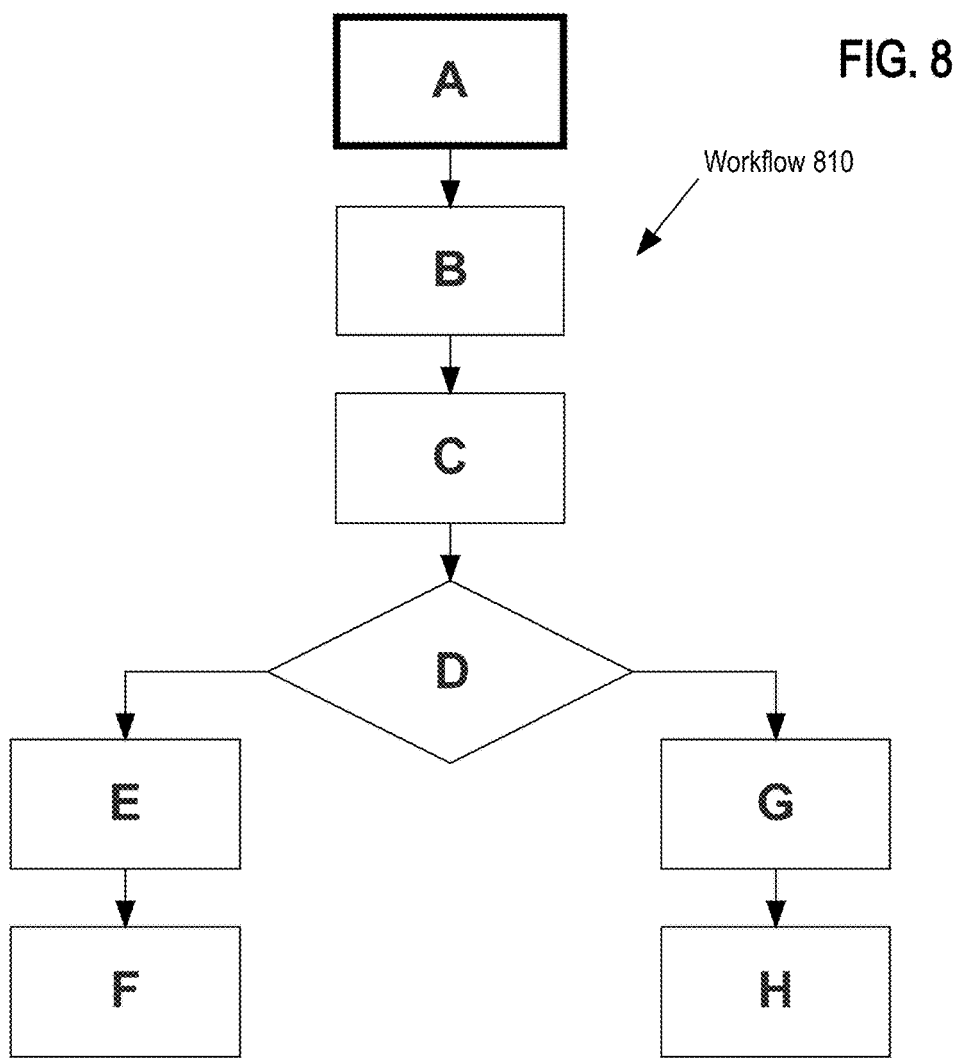
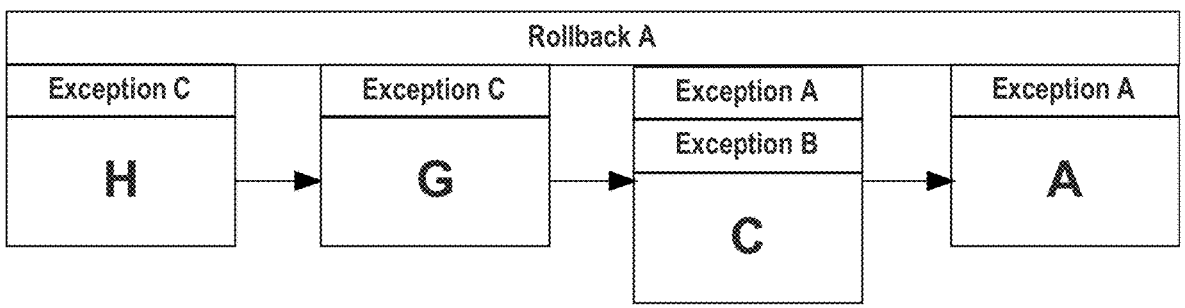
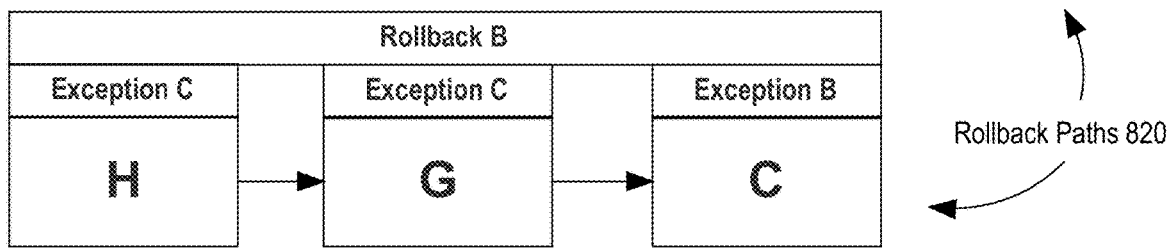
FIG. 8

TRACKING MICROSERVICES USING A STATE MACHINE AND GENERATING DIGITAL DISPLAY OF ROLLBACK PATHS

FIELD OF THE DISCLOSURE

The present disclosure relates to the technical field of computer-implemented state machine systems. The disclosure relates more specifically to tracking execution of microservices as part of a programmed computer-executed workflow and displaying a graphical user interface which depicts the workflow, exceptions, and rollback paths for the workflow.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern software applications come in various forms including cloud native applications which divide the totality of the application into several microservices that are executed in logical containers. The microservices are separate self-contained portions of an application which are configured to perform a specific service. For example, a purchasing application may include a microservice which is used to add an item to a cart, a microservice which is used to remove items from a cart, and a microservice which facilitates purchase of items in the cart.

Microservices may be implemented as stateless application components. As the microservice comprises software code which, when executed, performs a single task, the microservices do not store the state of their individual tasks. For workflows that include a plurality of microservices, state machines are used to identify the state of the overall workflow. A state machine is a separate microservice which interacts with the other microservices to determine whether the tasks have initiated, completed, or failed. The state machine stores the state of the overall workflow, indicating which tasks have been performed and which tasks have yet to be performed.

As an example, a workflow for establishing a connection with a modem may include steps of establishing an internet protocol (IP) address and registering with a cable modem termination service (CMTS). Separate microservices may be called to perform each of these steps with a state machine tracking performance of the steps and storing the outcomes.

When an application fails at a particular step, a computer system may perform a rollback operation to reset the application to a prior stored state. With the use of microservices which perform a single task and do not store their states, a rollback may include releasing memory or other resources which have been allocated during transactions. For instance, if a microservice procured an IP address prior to failure, a rollback may include disassociating the IP address with the computer system.

In a microservice based architecture, it is sometimes detrimental to perform a full rollback in response to receiving an exception. For instance, some resources may be time consuming and/or computationally expensive to allocate. Where a failure occurs further in the workflow than the allocation of the resource, a full rollback would require the system to reallocate the resource while a partial rollback could preserve the resource by resetting the workflow to a state after allocation of the resource but prior to the exception.

While a partial rollback would be more beneficial for the computing system, it can be difficult to determine when a partial rollback should be performed. As the applications are stateless, merely receiving the exception from the application would be insufficient to determine which rollbacks will preserve the allocated resources while properly handling the received exception. Furthermore, errors can be introduced in microservices or rollback programming when many different rollback processes are defined at different points of an executable workflow.

Thus, there is a need for a system which tracks performance of microservices and generates a display which depicts the tasks affected by performance of each rollback and the locations of each exception.

SUMMARY

The appended claims may serve to summarize the disclosure.

BRIEF DESCRIPTION OF THE DRAWINGS

In the drawings:

FIG. 8 depicts a graphical user interface displaying a workflow and a separate rollback path.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections below according to the following outline:
    General Overview
    Structural Overview
    Rollback Path Display Benefits of Certain Embodiments
Implementation Example—Hardware Overview General Overview Techniques for tacking performance of microservices and displaying a graphical visualization of a workflow along with exceptions and rollback paths are described herein. In an embodiment, a server computer system executes microservice tracking instructions to receive data from a plurality of microservices indicating initiation, performance, and/or failure of a plurality of tasks. When the server computer system determines that a task has failed, the server computer system causes displaying, on a client computing device, a graphical visualization of a workflow comprising a plurality of tasks. In response to user input selecting exceptions and/or rollback paths, the server computer system dynamically updates the workflow to cause displaying of nodes and edges corresponding to exceptions and/or node and edges corresponding to a rollback path.

In an embodiment, a method comprises receiving, from one or more sets of microservices program instructions, digital data identifying a plurality of tasks and a sequence of the tasks, the digital data specifying a particular computational workflow for execution by a computer; during execution of the workflow by the computer, identifying a particular failure in a first task of the plurality of tasks; displaying, on a client computing device, a graphical user interface comprising a plurality of nodes, the nodes corresponding to the tasks; displaying, with a particular node of the plurality of nodes corresponding to the first task, a graphical indication that the first task failed; displaying, with the plurality of nodes, a first rollback path comprising nodes and edges, the first rollback path comprising one or more graphical edges that graphically bypass each task of the workflow that would not be executed if a rollback is executed by the computer according to the first rollback path.

Structural Overview

Figure 1:
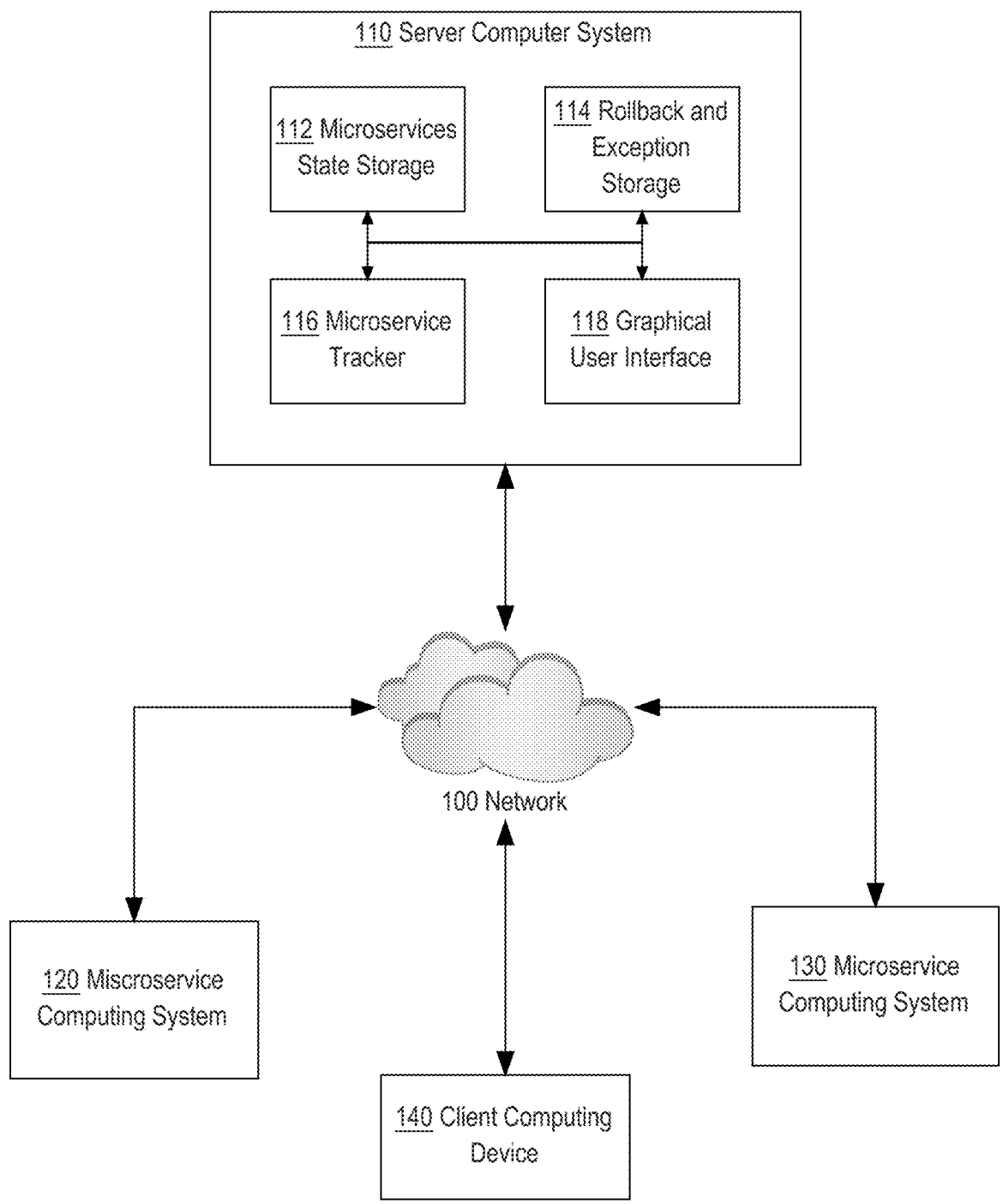
FIG. 1 depicts a schematic diagram for a system for tracking the state of a workflow and displaying an improved graphical user interface for improving the functionality of executing rollback procedures.

FIG. 1 depicts a schematic diagram for a system for tracking the state of a workflow and displaying an improved graphical user interface for improving the functionality of executing rollback procedures.

FIG. 1 includes a server computer system 110, microservice computing systems 120 and 130, and client computing device 140 communicatively coupled over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, microservices computing systems 120 and 130, client computing device 140, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Server computer system 110 may be implemented using a server-class computer or other computers having one or more processor cores, co-processors, or other computers. Server computer system 110 may be a physical server computer and/or a virtual server instance stored in a data center, such as through cloud computing. Server computer system 110 is programmed or configured to track the state of a workflow through microservice tracker 116 and microservice state storage 112. Server computer system 110 is further programmed or configured to store data identifying rollbacks and exception definitions for one or more workflows in rollback and exception storage 114 and to display a graphical user interface 118 on a client computing device 140 which includes workflows, rollback paths, and exception paths.

Microservice tracker 116 comprises one or more computer-readable instructions which, when executed by server computer system 110 cause server computer system 110 to communicate with one or more microservice program instructions in order to track performance of tasks by the microservice program instructions. For example, the server computer system 110 may use microservice tracker 116 to generate an instance which communicates with an application programming interface (API) of a separate microservice. The microservice program instructions may include microservices stored on server computer system 110 and/or microservices offered by one or more other computing devices, such as microservice computing systems 120 and 130. The server computer system 110 may execute the instructions of microservice tracker 116 to request, from each microservice, data indicating that execution of a task has started, failed, and/or completed successfully.

Server computer system 110 may store data identifying the state of a workflow in microservice state storage 112. For example, the server computer system 110 may store transient data in main memory of server computer system 110 which identifies the states of microservices in a particular workflow. When the particular workflow is completed, the server computer system 110 may delete the stored states of the microservices, thereby saving on storage space so that the server computer can continue to track the states of workflows without using a large amount of storage, such as persistent storage in a database.

Server computer system 110 may store data identifying rollback paths and exception definitions in rollback and exception storage 114. Rollback and exception storage 114 may store data identifying each rollback path for a particular workflow. The rollback paths indicate which tasks will not have been performed if a rollback to a prior state is executed. Thus, if out of 4 sequential tasks, A, B, C, and D, the rollback path includes tasks C and D, then execution of a rollback subject to the rollback path would restore the system to a state after performance of tasks A and B, but prior to performance of tasks C and D. The exception definitions identify which tasks are executed in response to an exception. For example, exception definitions may include reperforming a prior task and/or displaying an error.

Exception definitions may be defined for each workflow. Exceptions, as used herein, refer to abnormal conditions that are not part of the normal workflow. For example, the failure of a task due to a timeout may be defined as an exception. The server computer may store data identifying one or more tasks to be executed in response to each exception. The tasks may include tasks of the existing workflow and/or new tasks. For example, in response to a timeout exception, the server computer system may execute timeout exception instructions which cause the server computer system to attempt to reinitialize a connection prior to displaying an error.

Rollback paths may also be defined for each workflow. As used herein, a rollback path describes which tasks will not be executed if a rollback is executed in accordance with the rollback path. The rollback paths may include a partial rollback and a full rollback. A full rollback restores the system to the state prior to initiation of the workflow, thereby freeing up system resources but requiring re-performance of each task in the workflow. A partial rollback restores the system to a state after execution of at least one task in the workflow, thereby freeing up one or more resources while maintaining the state of the workflow prior to the at least one task. The rollback paths may identify each task which is "rolled back" or otherwise treated as having not occurred when the system is restored to a prior state.

Rollback paths may additionally include additional tasks that are performed to roll back prior tasks. For example, a rollback path may include tasks for disassociating an IP address or for resetting registration with one or more microservices. The additional tasks in the rollback path allow the server computer system 110 to release resources, such as IP addresses.

Graphical user interface 118 comprises instructions for generating an interface for displaying workflows, exceptions, and rollback paths. The graphical user interface may be configured to update the interface in response to selections of different rollback paths and/or exceptions. The graphical user interface 118 may additionally include options for executing a rollback based on a displayed rollback path.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer system 110.

Client computing device 140 is a computer that includes hardware capable of communicatively coupling client computing device 140 to one or more server computers, such as server computer system 110 over one or more service providers. For example, client computing device 140 may include a network card that communicates with server computer system 110 through a home or office wireless router (not illustrated in FIG. 1) coupled to an internet service provider. Client computing device 140 may be a server-class computer, smart phone, personal computer, tablet computing device, PDAs, laptop, or any other computing device capable of transmitting and receiving information and performing the functions described herein.

Microservice computing system 120 and microservice computing system 130 are computing devices which host one or more microservices. Microservice computing systems 120 and 130 may be server-class computer or other computers having one or more processor cores, co-processors, or other computers. Microservice computing systems 120 and 130 may be physical server computers and/or virtual server instances stored in a data center, such as through cloud computing. Multiple microservice computing systems may be associated with a single workflow. Additionally or alternatively, a workflow may be associated with only a single microservice computing system. In some embodiments, one or more of the microservices are hosted locally on the server computer system 110.

FIG. 1 depicts server computer 110, microservice computing systems 120 and 130, and client computing device 140 as distinct elements for the purpose of illustrating a clear example. However, in other embodiments, more or fewer computers may accomplish the functions described herein. For example, microservices may be hosted locally on server computer system 110 instead of at separate microservice computing systems 120 and 130. Additionally or alternatively, server computer system 110 may comprise a plurality of computing systems, include a system for tracking microservices and a system for providing the graphical user interface to the client computing device 140.

Rollback Path Display

Figure 2:
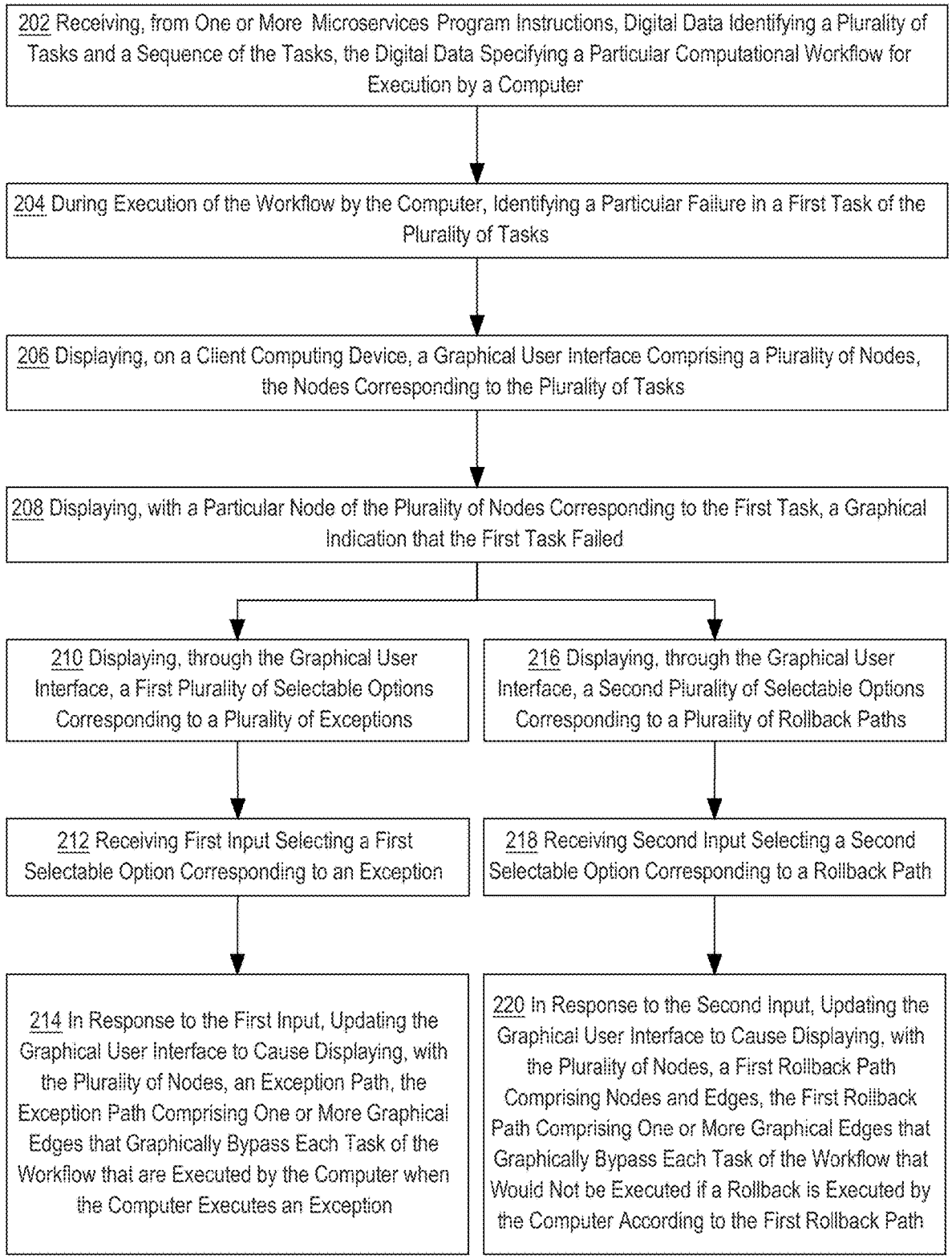
FIG. 2 is a flow diagram depicting an example method for generating a responsive graphical user interface for displaying rollback paths and/or exception paths.

FIG. 2 is a flow diagram depicting an example method for generating a responsive graphical user interface for displaying rollback paths and/or exception paths. While FIG. 2 describes a method for displaying rollback paths and exceptions in response to a failure occurring during execution of a workflow, in other embodiments, rollback paths and exceptions may be displayed without errors occurring in a workflow, such as for the purpose of generating new exception paths and/or rollback paths.

At step 202, digital data identifying a plurality of tasks and a sequence of the tasks are received from one or more microservices program instructions, the digital data specifying a particular computation workflow for execution by a computer. For example, an application for setting up a connection through a cable modem may comprise a plurality of microservices which are stored on a digital container. The microservices comprise microservice program instructions which, when executed, cause a computing device to perform a task associated with the microservice. Thus, a plurality of tasks for a single workflow may be performed through execution of discrete sets of microservices program instructions.

The server computer system 110 may comprise a state machine. The state machine acts as a workflow engine which interacts with the microservices and stores a current state of the workflow based on responses from the microservices. For example, the server computer system 110 may execute digital instructions to spin up an instance of a microservice tracker. The instance of the microservice tracker interacts with the APIs of the other microservices associated with a workflow. The microservice tracker may request status updates for individual tasks, thereby determining when a task is initiated, failed, or completed. The microservice tracker may additionally access data identifying a current workflow in order to determine which tasks are to be executed in which order.

At step 204, during execution of the workflow by the computer, a particular failure in a first task of the plurality of tasks is identified. For example, the microservice tracker may receive data from one of the microservices executing tasks of the workflow that indicates that the microservice failed to complete the task. The microservice tracker may store data identifying the task and an indication that the task failed. The microservice tracker may additionally stored data indicating the failure type.

At step 206, a graphical user interface comprising a plurality of nodes corresponding to the plurality of tasks is displayed on a client computing device. At step 208, a graphical indication that the first task failed is displayed with a particular node of the plurality of nodes corresponding to the first task. For example, the server computer system 110 may cause display of a message on the client computing device 140 that indicates that a failure occurred during the workflow. The server computer system 110 may additionally display options for executing a complete rollback or for viewing rollback options. In response to receiving input requesting a view of rollback options, the server computer system 110 may cause display, through a graphical user interface, of a node based diagram which includes nodes corresponding to tasks of the workflow and edges indicating connections between the tasks. The graphical user interface may additionally display an indication that the first task failed.

Figure 3:
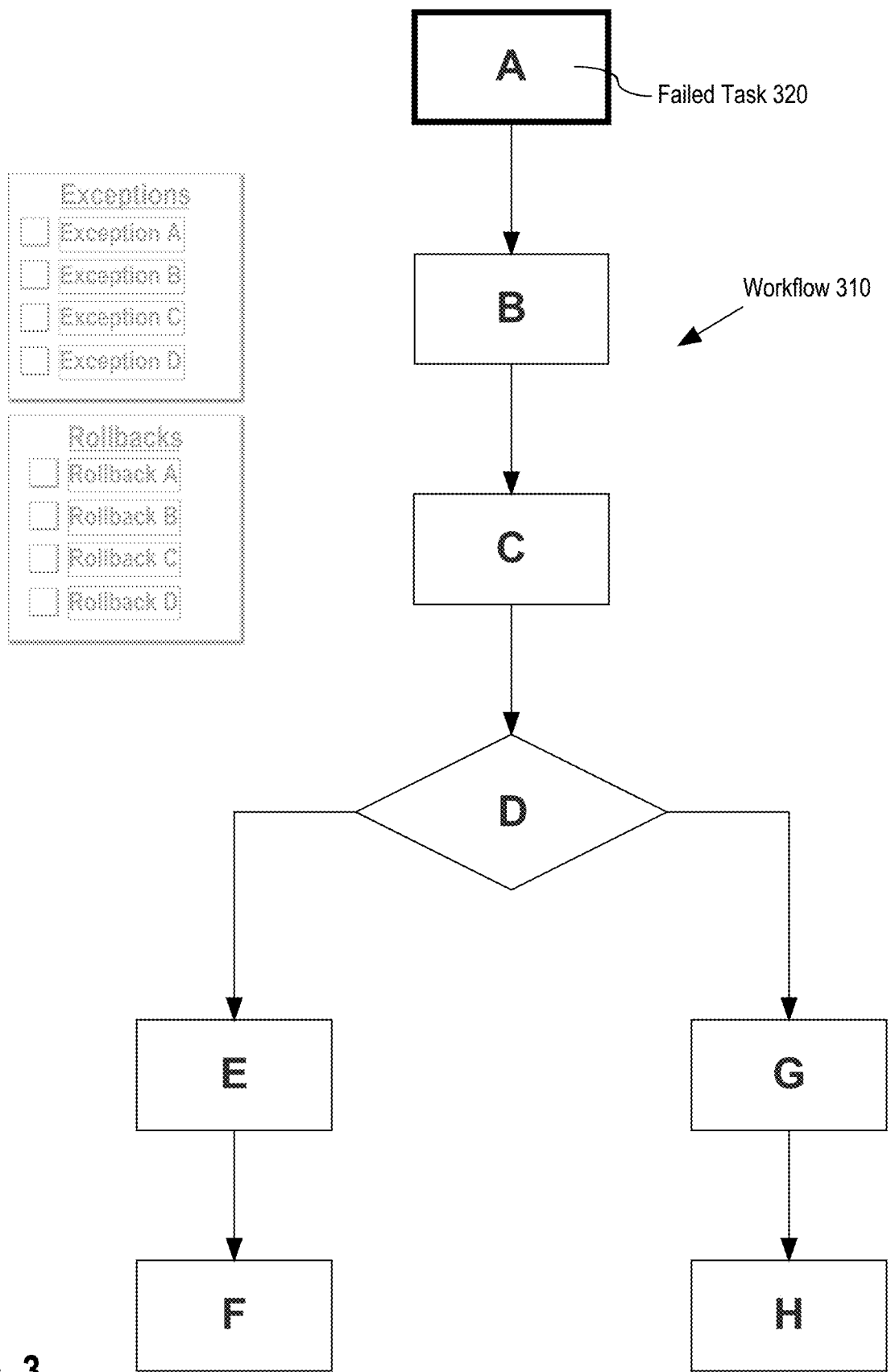
FIG. 3 depicts a graphical user interface displaying an example workflow.

FIG. 3 depicts a graphical user interface displaying an example workflow. Display 300 comprises displayed workflow 310 and failed task 320. Workflow 310 includes a visual indication of the tasks to be performed in a particular workflow and a sequence of performance for the tasks. For example, in FIG. 3, after execution of task A, the server computer system performs tasks B and C in order prior to determining whether to execute task E or task G. The workflow may be dynamically generated based on the tasks in the stored workflow for the service. Thus, the server computer system 110 may generate the individual nodes identifying each task based on identified tasks in the code of the workflow.

Failed task 320 in display 300 is a node representation of a task that failed during execution of the workflow. In the example of FIG. 3, task A failed before completion of the workflow. Thus, the node representing task A includes a visually distinct border in order to indicate that task A failed during execution of the workflow. Other embodiments may include a different color border or text and/or an icon displayed on or near the failed task 320 which visually indicates that the server computer system failed to complete the task.

FIG. 3-8 each are intended to depict an image being displayed on a display of a client computing device. FIG. 3-8 depict specific examples of the improved interface described herein. The graphical representations depicted in FIG. 3-8 may vary among different embodiments. Thus, exception options, rollback options, nodes, and edges may be displayed in a different formation than depicted in FIG. 3-8.

Referring again to FIG. 2, at step 210, a first plurality of selectable options corresponding to a plurality of exceptions are displayed through the graphical user interface. For example, the server computer system may identify each exception type for the particular workflow that is stored in rollback and exception storage 114. The server computer system 110 may cause displaying of options representing each of the identified exception types in the interface depicting the workflow.

At step 212, first input selecting a first selectable option corresponding to an exception is received. For example, the server computer system 110 may receive user input through the graphical user interface selecting one or more of the exception type options.

At step 214, in response to the first input, the system updates the graphical user interface to cause displaying, with the plurality of nodes, an exception path, the exception path comprising one or more graphical edges that graphically bypass each task of the workflow that are executed by the computer when the computer executes an exception. For example, the server computer system 110 may update the display to add additional nodes and/or edges to represent exception tasks for the selected exception.

Figure 4:
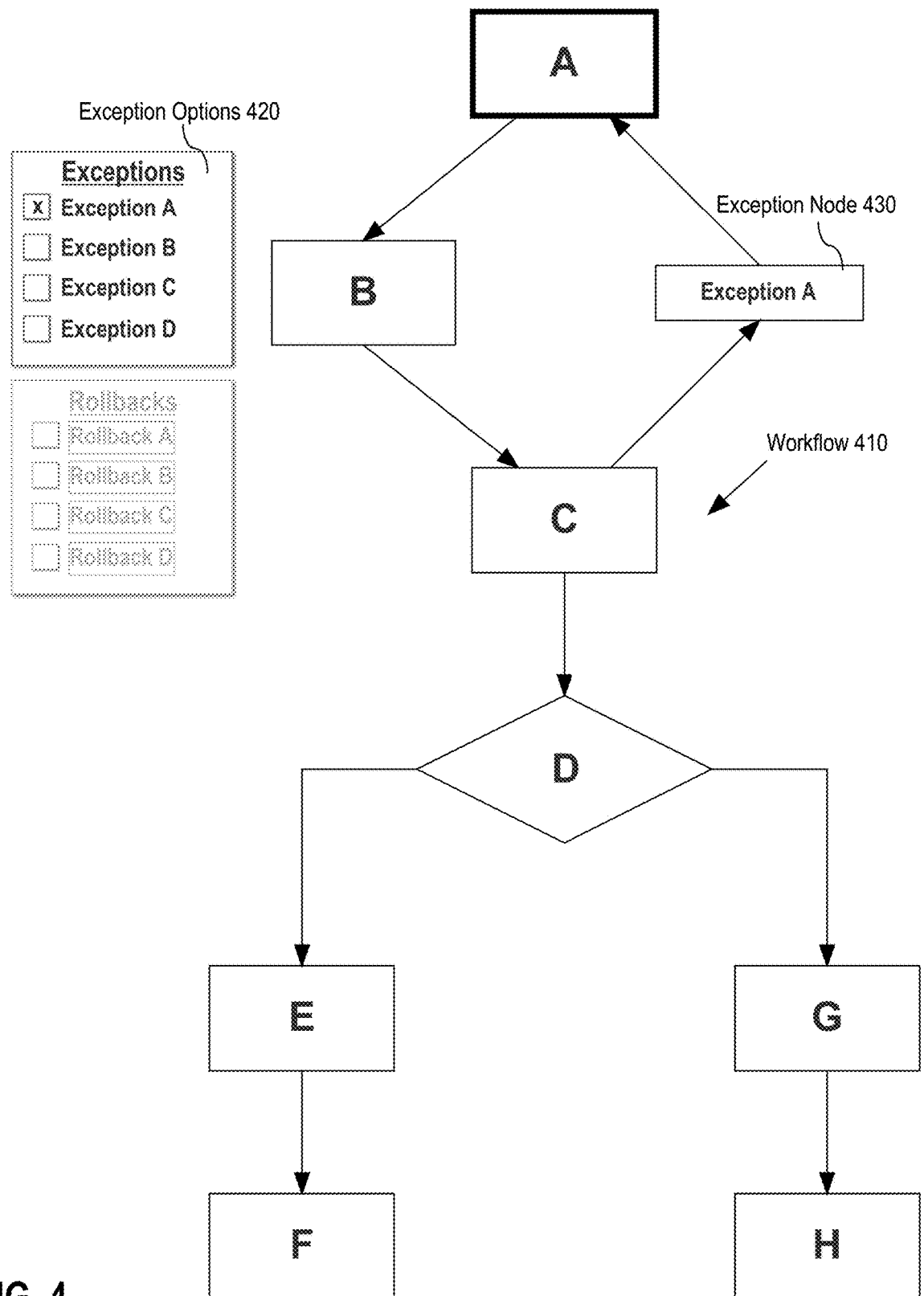
FIG. 4 depicts a graphical user interface displaying a workflow along with a graphical depiction of an exception.

FIG. 4 depicts a graphical user interface displaying a workflow along with a graphical depiction of an exception. Display 400 comprises workflow 410, exception options 420, and exception node 430. Workflow 410 comprises an updated view of workflow 310 from FIG. 3, but with the addition of the exception for exception A. As depicted in FIG. 4, altering the display to include the selected exception may include updating the locations of nodes of the workflow in order to accommodate the added exceptions.

Exception options 420 include selectable options corresponding to exceptions of different types. For example, exception A may refer to a timeout in node C while exception B may refer to receipt of an error from an external system. While exception options 420 are depicted as individual options with check boxes, other embodiments may include additional methods of displaying exception types, such as drop-down menus.

Exception node 430 comprises a node which corresponds to the selected exception. As an example, the node may define a task that is performed as part of the exception handling for a selected exception. For example, in response to receiving a selection of "Exception A" through the graphical user interface, the server computer system may identify that the exception handling for Exception A involves performing a task after performance of task C, followed by returning to task A. Additionally or alternatively, the exception node 430 may include an identifier of the exception type. Thus, if the exception type for exception A is a timeout when attempting to establish IP connectivity and the exception handling for exception A involves reperforming task A, exception node 430 may identify the exception as "timeout" while including edges from task C to task A. While FIG. 4 depicts edges directed to and from the exception, in an embodiment the edges connect the tasks and the exception node 430 appears either near the edge for the exception or overlaid on the edge for the exception.

Figure 5:
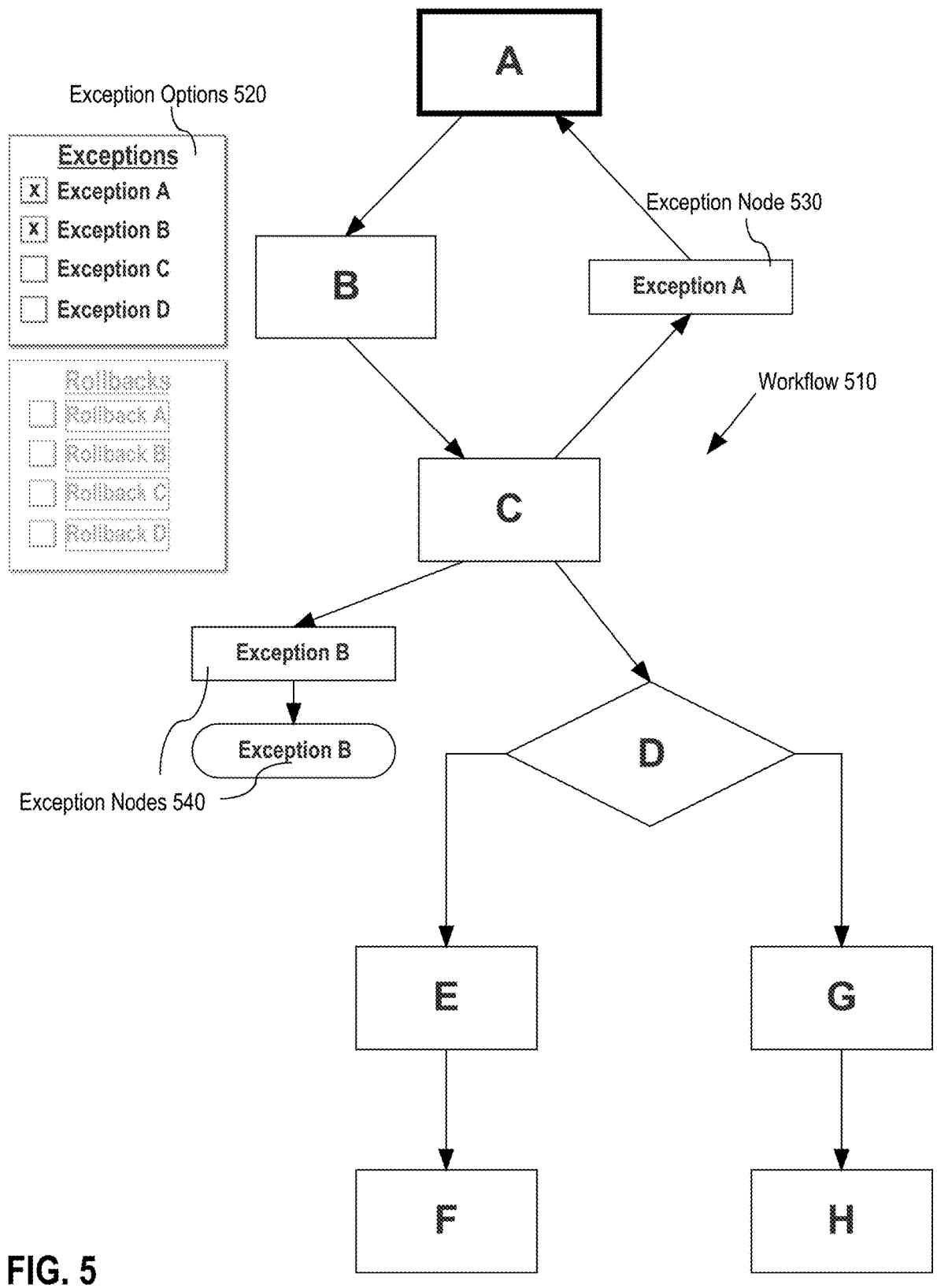
FIG. 5 depicts a graphical user interface displaying a workflow along with a graphical depiction of a plurality of exceptions.

In an embodiment, the server computer system updates the graphical user interface to simultaneously display a plurality of exception paths in response to selection of a plurality of exceptions through the graphical user interface. FIG. 5 depicts a graphical user interface displaying a workflow along with a graphical depiction of a plurality of exceptions.

Display 500 comprises workflow 510, exception options 52, exception node 530, and exception nodes 540. Workflow 510 comprises an updated view of workflow 410 from FIG. 4, but with the addition of the exception for exception B based on the selection of Exception B through exception options 520. The updating of workflow 510 in FIG. 5 comprises movement of nodes D-H in order to accommodate the placement of exception nodes 540. Exception nodes 540 comprise nodes corresponding to exception B. Exception B occurs following task C, but does not involve other nodes from the workflow. The exception nodes 540 may include identifiers of different aspects of the exception. For example, the final node of exception B may indicate that the system established a failure to connect while the first node indicates the exception type.

In an embodiment, multiple exception paths include the same pre-existing path of the workflow. For example, in FIG. 5 both exception node 530 and exception nodes 540 originate from task C. Additionally or alternatively, exception paths may include a same node that does not originate from the initial workflow. For example, different failures in task A and task C may cause the workflow to be not operational. Exceptions for the two failures may include the same final node of "not operational" while including other nodes related to the individual exceptions. Updating the workflow may include arranging the nodes so that both tasks A and C can be connected to the "not operational" node without bisecting the lines of other nodes.

Referring again to FIG. 2, at step 216, a second plurality of selectable options corresponding to a plurality of rollback paths is displayed through the graphical user interface. For example, the server computer system may identify each rollback path for the particular workflow that is stored in rollback and exception storage 114. The server computer system 110 may cause displaying of options representing each of the rollback paths in the interface depicting the workflow.

At step 218, second input selecting a second selectable option corresponding to a rollback path is received. For example, the server computer system may receive user input through the graphical user interface selecting one or more of the rollback path options.

At step 220, in response to the second input, the system updates the graphical user interface to cause displaying, with the plurality of nodes, a first rollback path comprising nodes and edges, the first rollback path comprising one or more graphical edges that graphically bypass each task of the workflow that would not be executed if a rollback is executed by the computer according to the first rollback path. For example, the server computer system 110 may update the display to add additional nodes and/or edges to represent the rollback path for the selected rollback type.

Figure 6:
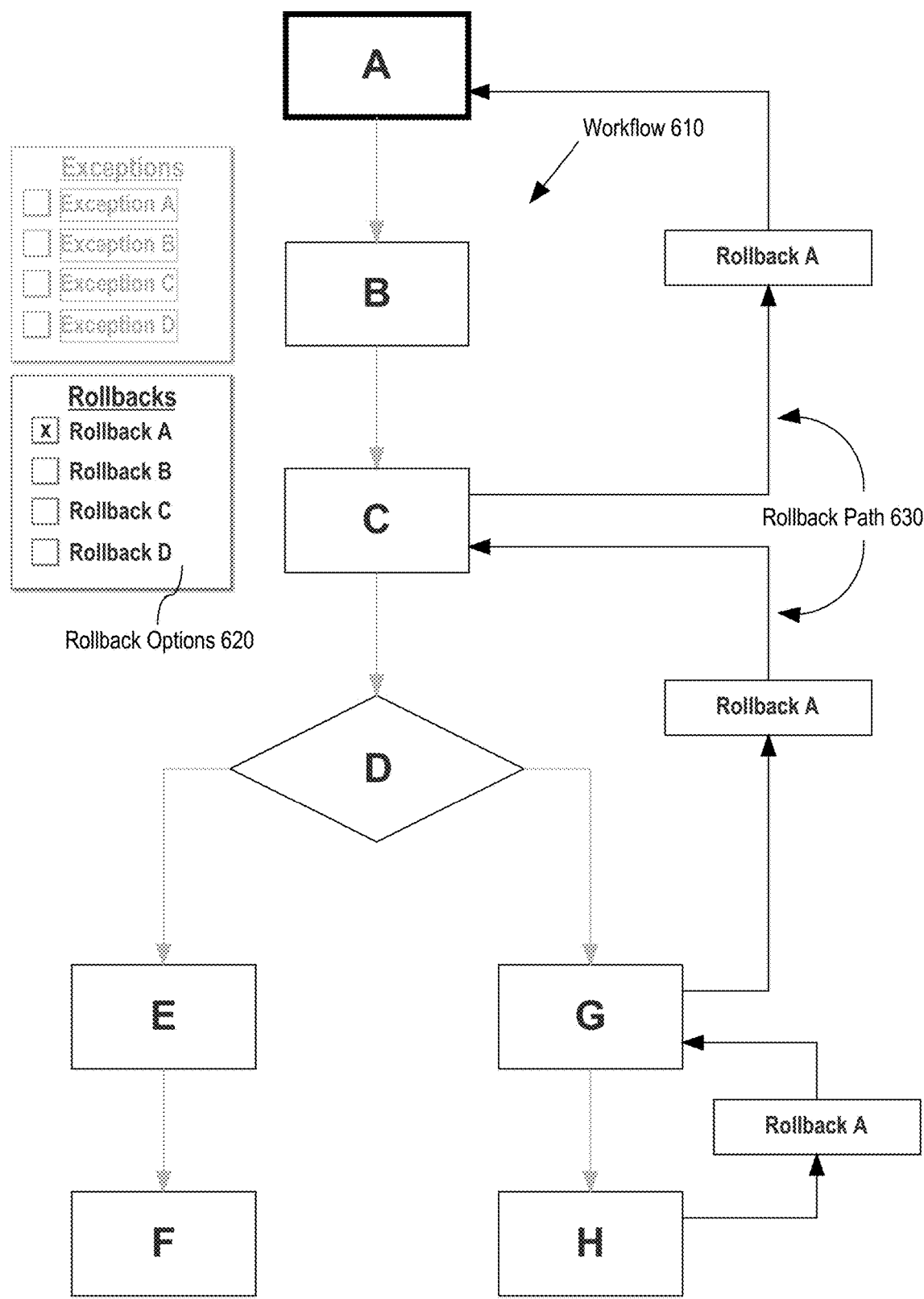
FIG. 6 depicts a graphical user interface displaying a workflow along with a rollback path for a particular rollback type.

FIG. 6 depicts a graphical user interface displaying a workflow along with a rollback path for a particular rollback type. Display 600 comprises workflow 610, rollback options 620, and rollback path 630. Workflow 610 comprises an updated view of workflow 310 from FIG. 3, but with the addition of the rollback path for rollback A based on the selection of Rollback A through rollback options 620.

Rollback options 620 include selectable options corresponding to rollbacks of different types. For example, Rollback A may refer to a rollback for disassociating an IP address, while Rollback B may refer to a rollback for resetting registration with an external service. While rollback options 620 are depicted as individual options with check boxes, other embodiments may include additional methods of displaying exception types, such as drop-down menus.

Rollback path 630 comprises one or more additional nodes and edges which connect one or more tasks which would be not be executed when a rollback is executed by the server computer system according to the selected rollback path. As used herein, not executed refers to the restoration of the workflow prior to a state where the task was executed. For example, if node C is a task for establishing IP connectivity, then a rollback path which bypasses task C would restore the workflow to the state prior to performance of task C, thereby releasing any resources which were stored based on execution of task C.

The rollback path may additionally include tasks which are performed as part of the rollback. For example, rollback path 630 includes a plurality of connecting nodes listed as "Rollback A". One or more of the nodes in rollback path 630 may indicate a separate task which is performed as part of the rollback procedures. Additionally or alternatively, the additional nodes in the rollback path may comprise identifiers for the type of rollback while the edges indicate the tasks which are being reset as part of the rollback. Thus, rollback A would cause the system to restore the workflow to a state prior to performance of tasks A-H. Any resources that were provisioned as part of tasks A, B, C, G, or H would be released as part of the rollback. While FIG. 6 depicts edges directed to and from the rollback path, in an embodiment the edges connect the tasks and the additional nodes of rollback path 630 appears either near the edge for the rollback or overlaid on the rollback path.

In an embodiment, updating the graphical user interface to display the rollback path comprises updating the visual indication of the workflow to deemphasize the workflow path in favor of the rollback path. Deemphasizing the workflow path may include changing the visualization of nodes and/or edges in the workflow path that are not included in the rollback path. For example, in display 600, the edges of workflow 610 have been greyed out in order to deemphasize the workflow path while emphasizing the rollback path. Other options may include changing the size, shape, and/or color of nodes or edges in the workflow path. Additionally or alternatively, the size, shape, and/or color of nodes or edges in the rollback path may be created to be distinguishable over the workflow path. For example, without changing the workflow path, a rollback path may be displayed which includes bolder lines for the edges and/or borders of nodes, thereby emphasizing the rollback path while deemphasizing the workflow path.

In embodiments, deemphasizing the workflow path may additionally include rearranging the nodes of the graph so that nodes of the rollback path are prominently featured while nodes that are not part of the rollback path are less prominently featured. For example, display 600 may be rearranged to include a central path of node A, the topmost node of rollback A, node C, the middle node of rollback A, node G, the bottommost node of rollback A, and node H. The remaining nodes B, D, E, and F may be included in the graph, but arranged off of a central view.

Figure 7:
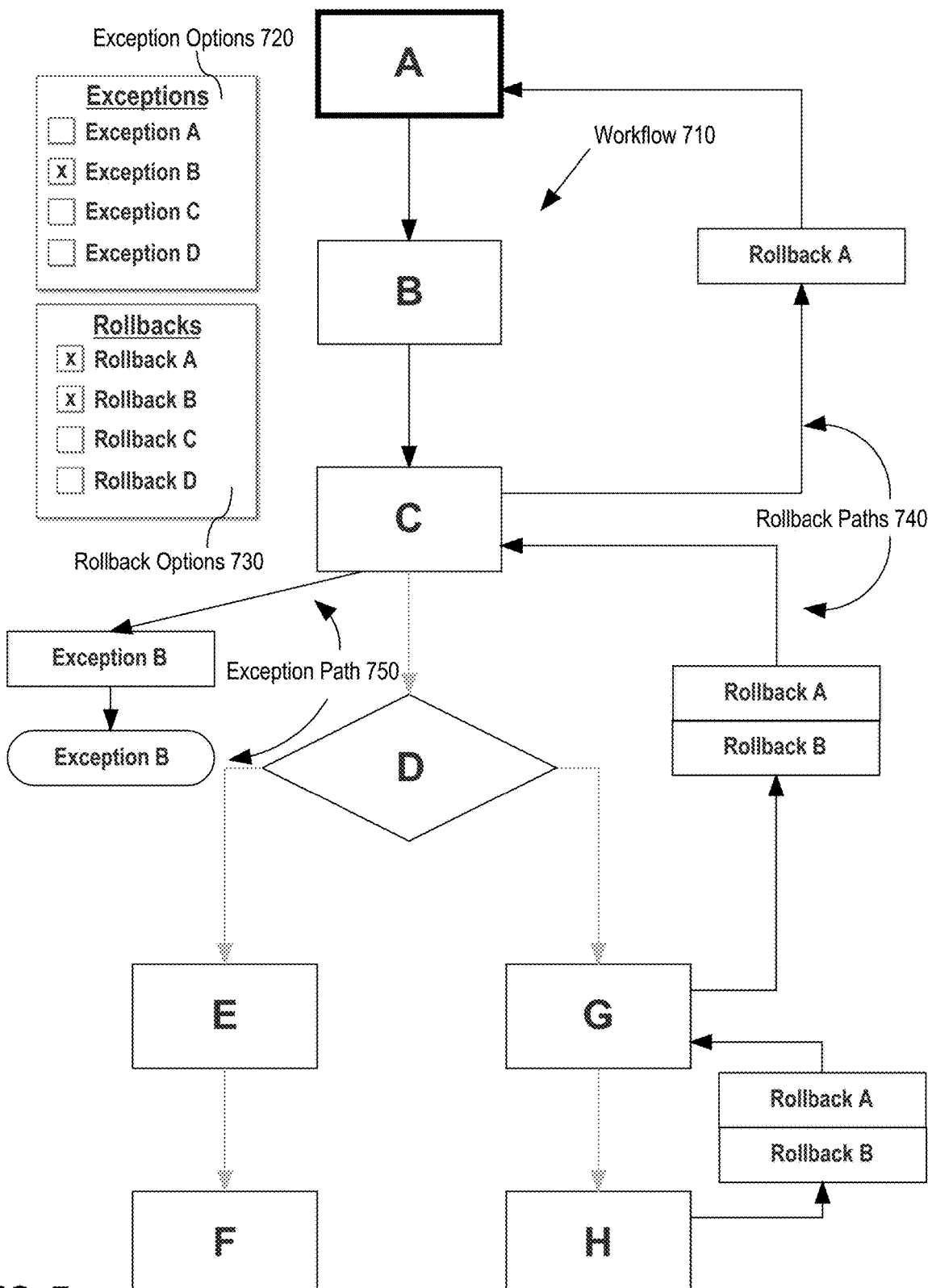
FIG. 7 depicts a graphical user interface displaying a workflow along with a plurality of rollback paths for a plurality of rollback types and a graphical depiction of an exception.

In an embodiment, a plurality of rollback paths may be displayed simultaneously through the graphical user interface. Additionally or alternatively, rollback paths and exception paths may be simultaneously displayed through the graphical user interface. FIG. 7 depicts a graphical user interface displaying a workflow along with a plurality of rollback paths for a plurality of rollback types and a graphical depiction of an exception.

Display 700 comprises workflow 710, exception options 720, rollback options 730, rollback paths 740, and exception path 750. The selected options in display 700 include the option for Exception B and the options for Rollbacks A and B. Thus, display 700 includes a depiction of the exception path for exception B and the rollback paths for rollbacks A and B. In an embodiment, overlapping rollback paths may be merged together to reduce the space of the graph. For example, in display 7, rollback paths A and B both bypass nodes H, G, and C. Thus, instead of depicting two separate rollback paths, the server computer system combines the rollback paths for rollback A and B into a single path bypassing nodes H, G, and C. The path for rollback A then continues from node C to node A.

The display of FIG. 7 includes concurrent display of a plurality of rollback paths along with an exception path. In an embodiment, the display further includes overlap between an exception identifier and the rollback paths. For example, to restore the workflow to a state prior to occurrence of exception B, the server computer would need to restore the workflow to a state prior to execution of the task associated with node C. Thus, the portion of the rollback path that bypasses node C may include an identifier of exception B. For example, a third node identifying exception B may be placed above the nodes identifying rollback A and rollback B, thereby allowing a viewer to easily identify which rollbacks would be effective in resetting a task which produced an exception.

Using the interfaces of FIG. 3-7, a server computer system is able to solve a computer based problem by providing functionality for selecting different exception types and rollback types and dynamically updating a workflow graph to visually depict selected exceptions and/or rollback paths for selected rollbacks. By dynamically updating the graph in response to a selection of different rollback paths, the server computer system is able to increase the functionality of the system. Additionally, by providing different rollback options, the methods described herein improve the server computer system by reducing memory and required performance of tasks after an initiated rollback. For example, by visually providing options for partial rollbacks, the server computer system presents functionality for selecting rollbacks that release resources after a failure while minimizing the number of tasks that must be performed after execution of the rollback.

In an embodiment, the graphical user interface includes functionality for performing a selected rollback. For example, the graphical user interface may include functionality for selecting a particular rollback, such as through the selectable options and/or through a selection of the rollback on the graph. The graphical user interface may additionally include a selectable option for executing a rollback according to the selected rollback path. In response to receiving a selection of the option, the server computer system may execute the stored rollback. Additionally or alternatively, the server computer system may update the microservices state storage to indicate that only the tasks performed prior to the tasks identified in the rollback path have been performed. The server computer system may then continue the workflow from the state identified in the microservices state storage 112.

While FIG. 4-7 depict the rollback paths and exception paths overlaying the workflow path, additional or alternative displays may include rollback paths displayed separately from the workflow path. FIG. 8 depicts a graphical user interface displaying a workflow and a separate rollback path. Display 810 comprises workflow 810 and rollback paths 820. While rollback paths 820 identify nodes from workflow 810, rollback paths 820 are displayed separately from workflow 810.

An advantage of rollback paths 820 in display 800 is that the separate paths are able to depict nodes of a specific path as well as their corresponding exception. For example, the path displayed for rollback A in FIG. 8 corresponds to the path for rollback A in FIG. 7. In display 810, rollback path A includes only the nodes bypassed by the rollback, thereby providing a clear indication of which tasks are involved in the rollback. Rollback paths 820 further include identifiers, with each node, of an exception corresponding to the node. For example, exception B is produced in response to a failure occurring during the task corresponding to node C. Thus, in the rollback path for rollback A, node C include an identifier of exception B. By displaying identifiers of the exceptions along with the rollback path, the server computer system generates a display which visually indicates the nodes in the rollback path and the exceptions associated with the nodes.

Display 800 may additionally include options for selecting individual rollback paths and/or exceptions. In response to receiving a selection of an option corresponding to a particular rollback path, the server computer system may display the rollback path separately from the workflow. Additionally or alternatively, in response to a selection of an option corresponding to an exception type, the server computer may display each rollback path which includes the selected exception type, thereby providing guidance as to which rollbacks would restore the system to a state prior to performance of the task which produced the exception of the particular exception type.

Benefits of Certain Embodiments

The methods described herein provide a structured graphical user interface paired with a prescribed functionality that is directly related to the graphical user interface's structure and is addressed to and resolved a specific computer based problem of providing a display of options for executing rollbacks in response to errors that occur during execution of microservices within a structured workflow. The graphical user interface includes a node based graph that is built based on tasks performed by different microservices and is graphically updated to display rollback paths and exceptions in response to user input. Additionally, the graphical user interface may include options for executing a rollback from a display depicting a rollback path for the rollback.

The storage and depiction of various rollback paths allows the server computer system to perform less extensive rollbacks when extensive rollbacks are unnecessary to restore the system to a state prior to execution of a failed task. Thus, if a first task requires a large amount of memory and computing time to complete, but a failure occurred in a subsequent task, the server computer system may present rollbacks which restore the system to a state after completion of the first task by prior to initiation of the subsequent task, thereby releasing resources which were procured during execution of the subsequent task without requiring the system to execute the first task again.

Furthermore, the techniques described herein can reduce the number and severity of errors that are introduced in programming workflows and rollback paths. Consequently, the techniques herein can be effective in reducing the amount of CPU resources, memory and storage that are required to program correct microservices with correct rollback paths, by providing computer-aided visualization techniques to efficiently display graphical symbols representing a plurality of different, overlapping rollback paths of arbitrary complexity in relation to graphical symbols representing a workflow of arbitrary complexity. Therefore, the present approaches offer the benefit of improving another technology, such as workflow programming or debugging exception handling paths and rollback paths, while also using a combination of processing steps that is unconventional and rooted in computer programming technology.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
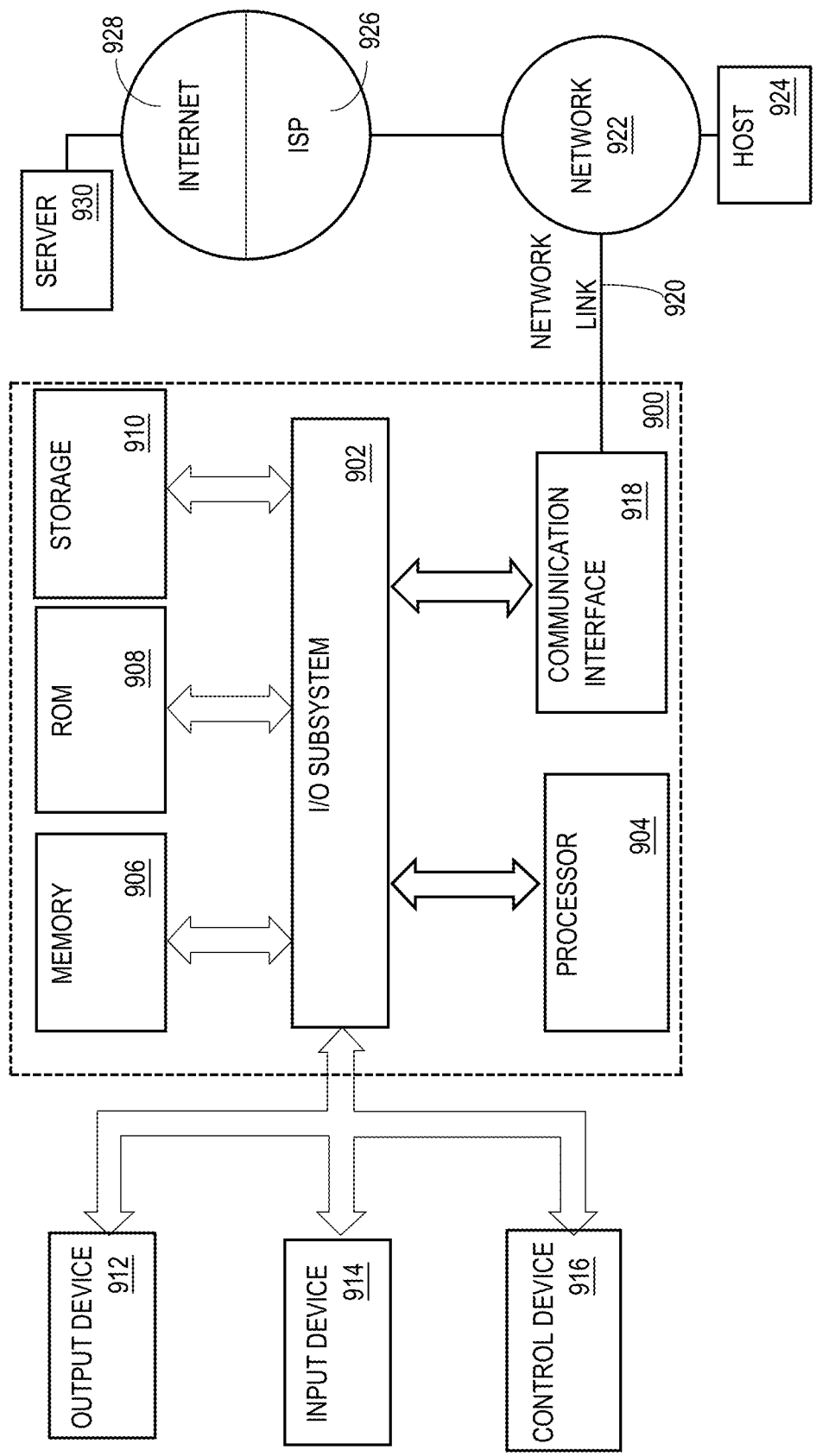
FIG. 9 is a block diagram that illustrates an example computer system with which an embodiment may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM, and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server 930 broadly represents any computer, data center, virtual machine or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or no SQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
    receiving, from one or more sets of microservices program instructions, digital data identifying a plurality of tasks and a sequence of the tasks, the digital data specifying a particular computational workflow for execution by a computer;
    during execution of the workflow by the computer, identifying a particular failure in a first task of the plurality of tasks;
    displaying, on a client computing device, a graphical user interface comprising a plurality of nodes, the nodes corresponding to the tasks;
    displaying, with a particular node of the plurality of nodes corresponding to the first task, a graphical indication that the first task failed;
    displaying, with the plurality of nodes, a first rollback path comprising nodes and edges, the first rollback path comprising one or more graphical edges that graphically bypass each task of the workflow that would not be executed if a rollback is executed by the computer according to the first rollback path;
    displaying, through the graphical user interface, a plurality of selectable options corresponding to different rollback paths wherein the different rollback paths include a full rollback path and a partial rollback path; and
    receiving a first input selecting a first selectable option corresponding to the first rollback path and, in response, displaying the first rollback path.

2. The method of claim 1, further comprising:
    displaying, through the graphical user interface, a workflow path comprising a plurality of nodes and edges, the workflow path comprising one or more graphical edges that graphically bypass each task of the workflow, wherein the first rollback path is depicted over a portion of the workflow path; and
    in response to receiving the selection of the first selectable option, altering the graphical user interface to cause de-emphasizing the workflow path and emphasizing the rollback path.

3. The method of claim 1, further comprising:
    receiving a second input selecting a second selectable option corresponding to a second rollback path; and
    causing displaying the second rollback path concurrently with the first rollback path, the second rollback path comprising one or more graphical edges that graphically bypass each task of the workflow that would not be executed if a rollback is executed by the computer according to the second rollback path, wherein a second task is included in both the second rollback path and the first rollback path.

4. The method of claim 1, further comprising:
    displaying, through the graphical user interface, a workflow path comprising a plurality of nodes and edges, the workflow path comprising one or more graphical edges that graphically bypass each task of the workflow; and
    displaying the first rollback path separate from the workflow path, wherein displaying the first rollback path comprises only displaying nodes corresponding to each task of the workflow that would not be executed if a rollback is executed by the computer according to the first rollback path.

5. The method of claim 4, wherein displaying the first rollback path further comprises indicating, on the first rollback path, one or more exception paths, the one or more exception paths comprising one or more graphical edges that graphically bypass each task of the workflow that are executed by the computer when the computer executes an exception.

6. The method of claim 1, further comprising:
displaying, through the graphical user interface, a plurality of selectable options corresponding to different exceptions; and
receiving first input selecting a first selectable option corresponding to a first exception path and, in response, displaying the first exception path, the first exception path comprising one or more graphical edges that graphically bypass each task of the workflow that are executed by the computer when the computer executes an exception of a first type.

7. The method of claim 6, further comprising:
receiving second input selecting a second selectable option corresponding to a second exception path; and
causing displaying the second exception path concurrently with the first exception path, the second exception comprising one or more graphical edges that graphically bypass each task of the workflow that are executed by the computer when the computer executes an exception of a second type, wherein a second task is included in both the second exception path and the first exception path.

8. The method of claim 6, further comprising displaying the second exception path concurrently with the first exception path.

9. A system comprising:
one or more processors; and
a memory communicatively coupled to the one or more processors storing instructions which, when executed by the one or more processors, cause performance of:
receiving, from one or more sets of microservices program instructions, digital data identifying a plurality of tasks and a sequence of the tasks, the digital data specifying a particular computational workflow for execution by a computer;
during execution of the workflow by the computer, identifying a particular failure in a first task of the plurality of tasks;
displaying, on a client computing device, a graphical user interface comprising a plurality of nodes, the nodes corresponding to the tasks;
displaying, with a particular node of the plurality of nodes corresponding to the first task, a graphical indication that the first task failed;
displaying, with the plurality of nodes, a first rollback path comprising nodes and edges, the first rollback path comprising one or more graphical edges that graphically bypass each task of the workflow that would not be executed if a rollback is executed by the computer according to the first rollback path;
displaying, through the graphical user interface, a plurality of selectable options corresponding to different rollback paths;
receiving first input selecting a first selectable option corresponding to the first rollback path and, in response, displaying the first rollback path;
displaying, through the graphical user interface, a workflow path comprising a plurality of nodes and edges, the workflow path comprising one or more graphical edges that graphically bypass each task of the workflow, wherein the first rollback path is depicted over a portion of the workflow path; and
in response to receiving the selection of the first selectable option, altering the graphical user interface to cause de-emphasizing the workflow path and emphasizing the rollback path.

10. The system of claim 9, wherein the instructions, when executed by the one or more processors, further cause performance of:
receiving a second input selecting a second selectable option corresponding to a second rollback path; and
causing displaying the second rollback path concurrently with the first rollback path, the second rollback path comprising one or more graphical edges that graphically bypass each task of the workflow that would not be executed if a rollback is executed by the computer according to the second rollback path, wherein a second task is included in both the second rollback path and the first rollback path.

11. The system of claim 9, wherein the different rollback paths include a full rollback path and a partial rollback path.

12. The system of claim 9, wherein the instructions, when executed by the one or more processors, further cause performance of:
displaying, through the graphical user interface, a workflow path comprising a plurality of nodes and edges, the workflow path comprising one or more graphical edges that graphically bypass each task of the workflow; and
displaying the first rollback path separate from the workflow path, wherein displaying the first rollback path comprises only displaying nodes corresponding to each task of the workflow that would not be executed if a rollback is executed by the computer according to the first rollback path.

13. The system of claim 12, wherein displaying the first rollback path further comprises indicating, on the first rollback path, one or more exception paths, the one or more exception paths comprising one or more graphical edges that graphically bypass each task of the workflow that are executed by the computer when the computer executes an exception.

14. The system of claim 9, wherein the instructions, when executed by the one or more processors, further cause performance of:
displaying, through the graphical user interface, a plurality of selectable options corresponding to different exceptions; and
receiving first input selecting a first selectable option corresponding to a first exception path and, in response, displaying the first exception path, the first exception path comprising one or more graphical edges that graphically bypass each task of the workflow that are executed by the computer when the computer executes an exception of a first type.

15. The system of claim 14, wherein the instructions, when executed by the one or more processors, further cause performance of:
receiving second input selecting a second selectable option corresponding to a second exception path; and
causing displaying the second exception path concurrently with the first exception path, the second exception comprising one or more graphical edges that graphically bypass each task of the workflow that are executed by the computer when the computer executes an exception of a second type, wherein a second task is included in both the second exception path and the first exception path.

16. The system of claim 14, further comprising displaying the second exception path concurrently with the first exception path.

17. A method comprising:
- receiving, from one or more sets of microservices program instructions, digital data identifying a plurality of tasks and a sequence of the tasks, the digital data specifying a particular computational workflow for execution by a computer;
- during execution of the workflow by the computer, identifying a particular failure in a first task of the plurality of tasks;
- displaying, on a client computing device, a graphical user interface comprising a plurality of nodes, the nodes corresponding to the tasks;
- displaying, with a particular node of the plurality of nodes corresponding to the first task, a graphical indication that the first task failed;
- displaying, with the plurality of nodes, a first rollback path comprising nodes and edges, the first rollback path comprising one or more graphical edges that graphically bypass each task of the workflow that would not be executed if a rollback is executed by the computer according to the first rollback path;
- displaying, through the graphical user interface, a plurality of selectable options corresponding to different exceptions; and
- receiving first input selecting a first selectable option corresponding to a first exception path and, in response, displaying the first exception path, the first exception path comprising one or more graphical edges that graphically bypass each task of the workflow that are executed by the computer when the computer executes an exception of a first type.

18. The method of claim 17, further comprising:
- displaying, through the graphical user interface, a plurality of selectable options corresponding to different rollback paths wherein the different rollback paths include a full rollback path and a partial rollback path; and
- receiving first input selecting a first selectable option corresponding to the first rollback path and, in response, displaying the first rollback path.

19. The method of claim 17, further comprising:
- receiving second input selecting a second selectable option corresponding to a second exception path; and
- causing displaying the second exception path concurrently with the first exception path, the second exception comprising one or more graphical edges that graphically bypass each task of the workflow that are executed by the computer when the computer executes an exception of a second type, wherein a second task is included in both the second exception path and the first exception path.

20. The method of claim 17, further comprising displaying the second exception path concurrently with the first exception path.

* * * * *